United States Patent [19]

Peterson

[11] Patent Number: 4,947,311
[45] Date of Patent: Aug. 7, 1990

[54] ELECTRICAL POWER CONVERSION CIRCUIT

[75] Inventor: William A. Peterson, Vestal, N.Y.

[73] Assignee: General Electric Company, Binghamton, N.Y.

[21] Appl. No.: 437,242

[22] Filed: Nov. 16, 1989

[51] Int. Cl.$^5$ .......................................... H02M 7/00
[52] U.S. Cl. ................................ 363/124; 323/225; 323/350; 323/224; 323/282
[58] Field of Search ............... 323/223, 225, 324, 350, 323/351, 222, 224, 282; 363/124

[56] References Cited

U.S. PATENT DOCUMENTS

| | | | |
|---|---|---|---|
| 4,161,023 | 7/1979 | Goffeau | 323/224 |
| 4,168,477 | 9/1979 | Burchall | 323/222 |
| 4,347,474 | 8/1982 | Brooks et al. | 323/224 |
| 4,408,268 | 10/1983 | Peters et al. | 363/124 |
| 4,672,303 | 7/1987 | Newton | 323/222 |
| 4,713,742 | 12/1987 | Parsley | 363/124 |
| 4,727,308 | 2/1988 | Huljak et al. | 323/222 |
| 4,729,088 | 3/1988 | Wong | 323/224 |
| 4,736,151 | 4/1988 | Dishner | 323/222 |
| 4,801,859 | 1/1989 | Dishner | 323/222 |

Primary Examiner—Peter S. Wong
Assistant Examiner—Jeffrey Sterrett
Attorney, Agent, or Firm—Richard V. Lang; Fred Jacob; Ernest F. Chapman

[57] ABSTRACT

An electrical power conversion circuit having a readily varied conversion ratio and accommodating bidirectional energy flows is disclosed. The converter employs a series connected and a shunt connected semiconductor switch which may be either unidirectional or bidirectional (depending upon whether AC/DC or DC only operation is sought) and an inductor. The switches are insulated gate voltage controlled devices with charge storing capacity present at the gate. The switches are operated from a variable duty cycle rectangular pulse which is differentiated at the leading and trailing edges to form two pairs of oppositely sensed short duration pulses. The two pairs of short duration pulses are then coupled by a transformer having two matched but oppositely sensed secondaries to the gate circuits of the two semiconductor switches. A Zener diode in each gate circuit preserves the charge stored at each gate resulting from the first positive pulse of the pair, and allows the semiconductor gate capacity to discharge as the following negative pulse appears. The circuit thus reconstitutes the original rectangular waveform in two mutually inverted forms at the gates of the two semiconductor switches to achieve the required alternate switching states with high accuracy and with a minimum of components. The AC/DC or DC only circuit is reduced in size and weight by a factor of 10 from that of a conventional AC only adjustable autotransformer.

18 Claims, 4 Drawing Sheets

ELECTRICAL POWER CONVERSION CIRCUIT

The present invention relates generally to electrical power conversion circuits and particularly to a solid state power conversion circuit having readily varied conversion ratios and accommodating bidirectional energy flows with complementary conversion factors.

BACKGROUND OF THE INVENTION

An electrical power conversion circuit is a circuit in which the form of the electrical power is changed to adapt a power source having predetermined voltage and current to a load requiring a different predetermined voltage and current, it being assumed that the power available from the source is adequate to meet the power demand of the load. The power conversion circuits to which the present invention relates, may be further characterized as reasonably efficient, and not effecting the necessary change in the form of the electrical power through dissipation.

The usual desired conversions are adapting a power supply having a higher output voltage/current to a load requiring a lower supply voltage/current or adapting a power supply having a lower output voltage/current to a load requiring a higher supply voltage/current. Assuming high conversion efficiency, making the power output substantially equal to the power input, the voltage-ampere products (assuming a resistive load) will be substantially the same at the source and at the load. Assuming a fixed VA product at the input of a converter, reducing the voltage at a resistance load is accompanied by an increase in load current and increasing the load voltage is accompanied by a decrease in load current.

A further necessary feature of an electrical power conversion circuit is that it be able to accommodate bidirectional energy flows which are present when the loads are reactive and must periodically return stored energy to the source. Reactive loads are, of course, commonplace.

A transformer is by far the most commonly used electrical power conversion device but it is restricted to AC electrical power conversion. Transformers are efficient in transforming AC voltages and currents supplied to their primary windings to suit the requirements of loads connected to their secondary windings. Transformers also accommodate bidirectional energy flows (with the complementary voltage and current conversion factors noted above).

Electrical transformers, though simple in construction, reliable in operation and quite efficient, are not without disadvantages. As power levels increase, they become quite bulky in size and heavy in weight, a distinct disadvantage in many special applications, such as avionics. Since power transformation is set by the turns ratio, the conversion factors of a power transformer can not be varied without some sort of tap-changing mechanism. While the efficiencies of modern power transformers may be quite high, they nevertheless do impose some losses, which may become significant. Moreover, under certain conditions, power transformers will introduce waveform distortions in their outputs, which in certain applications cannot be tolerated. Consequently, additional wave-shaping or filtering networks must be utilized.

The final and particularly significant drawback of power transformers is that they are strictly AC devices, and thus cannot transform DC or very low frequency AC input power.

A proposed solution for bidirectional AC/DC electrical power conversion has been described in a patent. In the described circuit, the ungrounded terminal of the power source is connected to one terminal of a first "series" switch, the other switch terminal being connected at a node to one terminal of an energy storing inductor, the other inductor terminal being connected to the ungrounded terminal of the load. The grounded terminal of the power source is connected to the grounded terminal of the load and a second, shunt connected, switch is provided connected between the node and ground. An energy storing capacitor is connected between the two load terminals.

The switches of the described circuit, which are characterized as "bidirectional chopper switches", are operated cyclically with one switch being maintained in an alternate state to that of the other switch. The duty cycle is then adjusted to adjust the voltage conversion (or current conversion) ratio between source and load. The suggested switching device is a bipolar junction transistor installed across the DC terminals of a four diode bridge to facilitate bidirectional operation, the AC terminals of the bridge providing the switching terminals.

In the described circuit, control of the switching is achieved by a direct connection from a single pwm oscillator to the base of one switching transistor, and an indirect connection to the base of the other switching transistor via an inverter. Since the emitters of both transistors are returned to one of the DC terminals of the bridge, one emitter of which may be at the source (or load) potential, and the other emitter of which may be at ground potential, it is apparent that an isolated drive to the input junctions, not referenced to the circuit potentials or to the drive supplied to the other switch may be necessary to a practical form of the described circuit.

While sound in principle, the described circuit assumes ideal switching devices but the described devices are less than ideal and the circuits themselves place severe demands upon the switching devices in delivering significant power to a load.

Bipolar junction transistors, particularly power transistors, are known to store significant amounts of charge in the junction region. Should a control voltage be applied to turn one transistor off as a complimentary control voltage is being applied to turn the other transistor on, the flow of current in the first transistor would continue for sometime after the turn off control had been applied, and simultaneous conduction in both transistors would result. Simultaneous conduction by the two transistors causes a short circuit across the power source and may be expected to produce potentially damaging currents.

Unfortunately, a simultaneous off condition for both switches is little better. Should the switching be so timed that the first transistor is turned off before the second transistor is turned on, the series inductor in circuit with the opening switch would seek out a path to discharge the energy stored in its magnetic field. In discharging through the opening switch, that switch is stressed and likely to product potentially damaging voltages.

Further complicating the picture in using paired bipolar junction power transistors is the requirement of significant current for the base drives which further complicates the achievement of synchronized commutation beyond that of a more purely voltage controlled device.

In realizing a practical bidirectional AC/DC electrical power conversion circuit similar to the described circuit, the present invention addresses the need for selection of more practical semiconductor switches and for a commutation circuit which avoids placing unnecessary commutating stresses upon the switches.

SUMMARY OF THE INVENTION

It is accordingly an object of the present invention to provide an improved electrical power conversion circuit.

It is another object to provide an improved electrical power conversion circuit having complementary conversion ratios which are readily varied.

It is still another object to provide an improved electrical power conversion circuit which can accommodate input power over a wide frequency range down to and including zero, i.e. DC.

It is a further object to provide an electrical power conversion circuit having an improved switching function.

It is an additional object to provide an electrical power conversion circuit having a wide range of complementary conversion ratios.

It is an additional object to provide an electrical power conversion circuit which is of a compact, light weight construction, electrically efficient and reliable.

These and other objects of the invention are achieved in a novel electrical power conversion circuit comprising a first bidirectional switching circuit serially connected at a first node to an energy storing inductor and a second bidirectional switching circuit connected between the first node and a second node. The source, which may be AC or DC has one terminal connected to one terminal of the series circuit and the load has one terminal connected to the other terminal of the series circuit. The other terminals of source and load are connected to the second node.

In accordance with the invention, the switching devices are insulated, voltage controlled, commutation gate MOSFET devices. The circuit requires significant charge storing capacity at the gate which may be provided by the MOSFET device, either by itself or supplemented with a capacitor. A Zener diode connected in each gate circuit sustains any stored charge until breakdown.

The switching is readily controlled and the duty cycle of the converter varied by the provision of high frequency (e.g. 100 KHZ) rectangular pulses of the desired duty cycle. The rectangular pulses are then differentiated at the leading and trailing edges to form a first pair of positive-negative spikes and a second pair of negative-positive spikes, whose timing defines the desired duty cycle. The energy content of the pulses may be very small, and while conveying variable duty cycle information pulses in this form do so without requiring DC restoration and are suitable for transformer coupling.

The control circuit then includes a small high frequency transformer having a primary and two matched secondary windings. The secondaries are coupled in initially opposite polarities to the two semiconductor switches to effect opposite sense switching. The first positive spike in each secondary charges the semiconductor gate capacity and the following negative pulse exceeds the Zener voltage and discharges the gate capacity. The result is that the control circuit reconstitutes the original rectangular wave at the semiconductor gate and does so accurately and without the need for large circuit components or complicated circuits. For a conservative design, low cost measures may be used to delay the "on" time to preclude joint "on" states of the semiconductor switches and to minimize stresses due to significant joint "off" states of the switches.

BRIEF DESCRIPTION OF THE INVENTION

For a full understanding of the nature and objects of the invention, reference may be had to the following detailed description taken in conjunction with the accompanying drawings, in which.

Like reference numerals refer to corresponding parts throughout the several figures of the drawings.

DETAILED DESCRIPTION

Figures 1A, 1B:
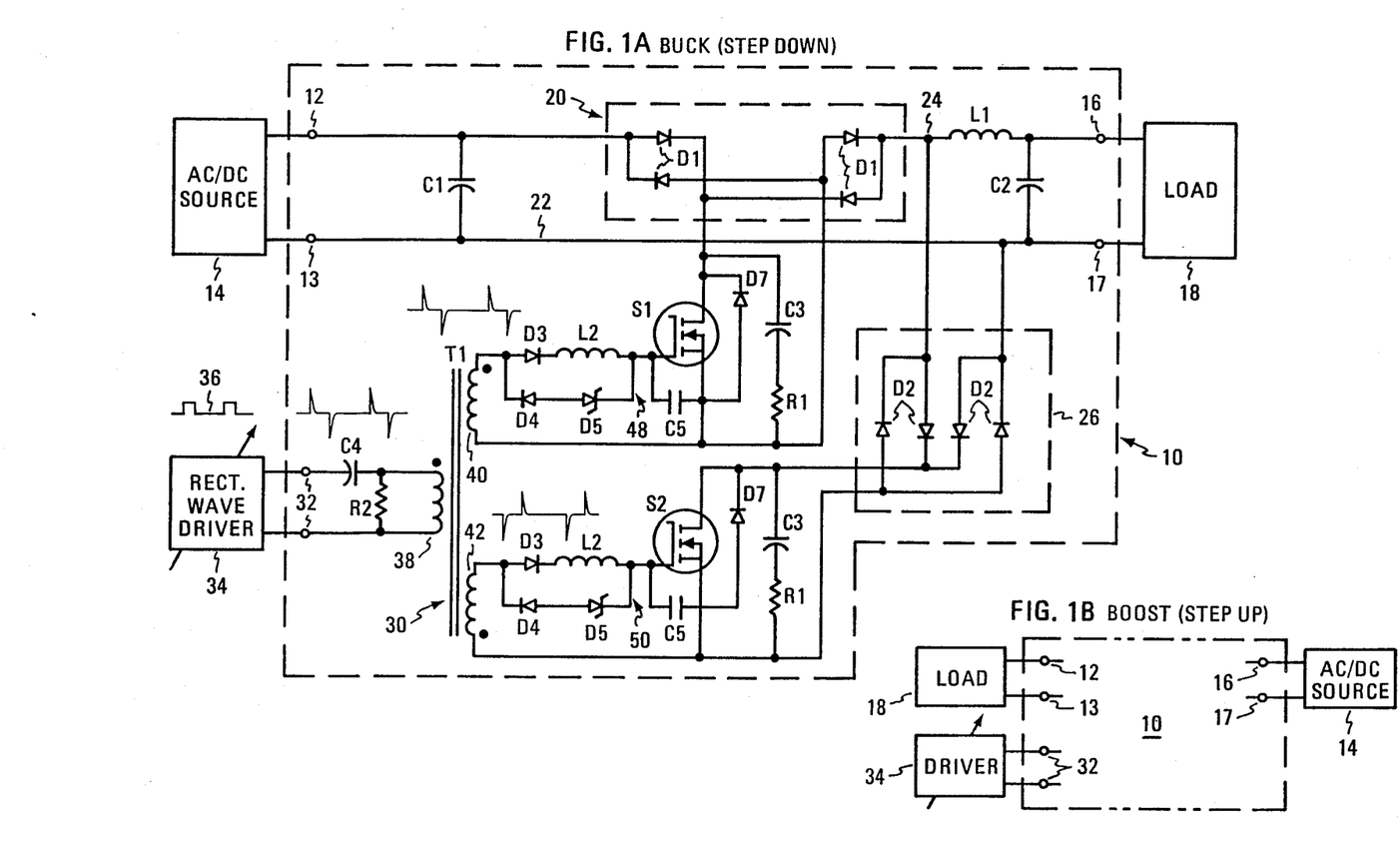
FIG. 1A is a schematic circuit diagram of an electrical power conversion circuit in accordance with a first embodiment of the present invention, in which the source and the load are connected to bring about buck conversion operation and the power source may be AC or DC of either polarity.
FIG. 1B is a circuit diagram of the same conversion circuit in which the source and the loads are interchanged to bring about boost conversion operation.

Referring to FIG. 1A, a power conversion circuit constructed in accordance with the present invention and generally indicated at 10 includes a pair of input terminals 12 and 13 for connection with an energy souce 14 and a pair of output terminals 16 and 17 for connection to an electrical load 18. The source 14 may be an AC or DC source, and principal energy flow may be from left to right as shown or from right to left as shown in FIG. 1B.

Input terminal 12 is serially connected to output terminal 16 through a full wave rectifying bridge 20, consisting of diodes D1, a unidirectional solid state switch S1 and an anergy storage inductor L1. Input terminal 1 and output terminal 17 are directly interconnected by a lead 22 forming a first node. The junction or second node 24 between rectifying bridge 20 and inductor L1 is connected to lead 22 through a full wave rectifying bridge 26, consisting of diodes D2, and a second unidirectional solid state switch S2. A filter capacitor C1 is connected across input terminals 12, 13, and a second filter capacitor C2 is connected across output terminals 16, 17. A separate snubber circuit, consisting of a series capacitor C3 and resistor R1, is connected across each switch S1, S2.

From the description thus far, it is seen that the load 18 is serially connected via switch S1 and inductor L1 across the terminals 12 and 13 of the source 1A, while switch S2 is connected in shunt relation with the series combination of the inductor and the load. In operation, these switches S1 and S2 are commutated such that series switch S1 is conductive while shunt switch S2 is non-conductive and vice versa.

The ratio of the conducting time of switch S1 to the sum of its conduction and non-conduction times in each switch commutation period is referred to as the duty cycle $\alpha$. The conduction time of series switch S1 is thus $\alpha T$, where T is the period of the switch commutation cycle. The conduction time of shunt switch S2 is thus $(1-\alpha)T$. For energy flow from left to right as illustrated in FIG. 1A, circuit 10 functions as a buck converter whose output voltage is less than its input voltage in direct proportion to the duty cycle ($V_{in}\cdot\alpha = V_{out}$).

For energy flow from right to left, the circuit shown in FIG. 1B functions as a boost converter whose output voltage is greater than its input voltage in inverse proportion to the duty cycle ($V_{in}\cdot 1/\alpha = V_{out}$).

By virtue of full wave rectifying bridges 20, 26, unidirectional semiconductor switches S1, S2 become, in effect, bidirectional switches capable of conducting current flowing in either direction through the circuit. This may be readily appreciated by recognizing that the bridges have a pair of AC terminals, where unlike diode electrodes are connected and a pair of DC terminals while like diode electrodes are connected. Assuming that the AC terminals are connected, as in the bridge 20 between the terminal 12 and node 24, two current paths are provided in the connect sense through the unidirectional switch SW1—one path assuming current flow from 12 to 24, and the other path assuming current flow from 24 to 12. The bridge 26 makes the unidirectional semiconductor switch S2 bidirectional.

Since power conversion circuit 10 is essentially lossless, the voltage ampere products (for a resistive load) are alike at source and at load. Thus, assuming a given source VA (and a resistive load), the load current is stepped up in proportion to the reduction in the load voltage, and vice versa. Thus, the same transformation or conversion factors as a power transformer are provided. However, power conversion circuit 10 provides these transformer-like conversion factors at low frequencies down to and including DC. The only frequency limitation is an upper limit imposed by the switch commutation or chopping frequency (1/T), which should be high enough to accurately sample the waveform without substantial transients between samples.

The essential problem in the buck and boost configurations, as earlier discussed, is the avoidance of substantial periods when both semiconductor switches are both "off" or both "on". With the presence of energy storage inductor L1, it is very important to avoid simultaneous cut-off of switches S1 and S2. Simultaneous non-conduction of the switches, opens the circuits to the inductor L1 to cause high voltage spikes. Similarly capacitor C1 is connected directly across the series combination of the switches S1 and S2. The switches will be subjected to large current spikes if both become conductive and provide a path for the capacitor C1 to discharge. Either condition, which typically is repeated during each commutation cycle, is extremely stressful and potentially damaging to circuit components, particularly the switches S1, S2.

Accuracy in commutation, which increases the reliability of the circuit, is achieved by the selection of a voltage controlled semiconductor switch having an insulated gate and by commutating the semiconductor switches in a novel commutation circuit using pairs of oppositely sensed low energy short duration pulses to set the conduction periods. Two benefits which flow from a practical embodiment of the invention are a significant reduction in convertor weight for a given power level and a very large range of duty cycle variation permitting a very large range of voltage (or current) controls.

The semiconductor switches S1 and S2 are insulated gate devices. They must, of course, have the necessary output current and output voltage ratings, and low switching resistance to handle the required power. In addition they should have high input impedances, be voltage controlled devices and be readily commutated (i.e. turned either "on" or "off"). As will be seen, switching at a clocking rate of 100 KHZ is contemplated, using 0.2 microsecond pulses of alternating polarity, whose interval determines the conversion factors. The devices may have some input capacity, but not so much as to extend the switching transients. Two devices which may be used, are currently available metal oxide semiconductor field effect transistors (MOSFETS), and insulated gate bipolar transistors (IGBTS).

To commutate the switches S1 and S2, a novel commutation circuit 30 is provided. This circuit includes a pair of input terminals 32 to which is connected a source 34 of the square wave driver pulses 36. The square wave driver pulses may be derived from logic circuitry, and consist of a succession of square wave pulses alternating between a 0 and a 1 state, with a fixed period of 10 microseconds (corresponding to 100 KHZ repetition rate) and with a variable duration "on" state for control of the voltage conversion ratio as earlier discussed. In accordance with a practical embodiment, the "on" time can vary from approximately 2 microseconds to 10 microseconds, to provide a range of duty cycle variation of about 50 to 1, and a comparable variation in voltage at the load.

Square wave driver pulses 36 (FIG. 2) are differentiated by capacitor C4 and applied to the primary winding 38 of a small pulse transformer T1. The effect of the differentiating action is to create a short duration positive going pulse at the leading edge of each "on" state of the driver pulse 36 and a short duration negative going pulse at the trailing edge.

The differentiation described above avoids the adverse affect of the DC component in any succession of rectangular pulses with a non-50% duty cycle taken from a transformer output. When a non-50% duty cycle rectangular pulse is passed by a transformer, the shorter duration interval is of a different weighting than the longer duration interval as the transformer tends to equalize the volt time areas between "on" and "off" times, thus changing the magnitudes of the secondary voltages and disrupting any switching function which is voltage magnitude dependent.

Differentiating the rectangular pulses 36 as provided by capacitor C4 and resistor R2 avoids the foregoing problem. Differentiating immediately marks the leading edge of the longer rectangular pulse (36) by an initial rising transient starting from the base line as the leading edge of pulse 36 begins and a second falling transient as the leading edge of pulse 36 ends, the second transient returning at a less precipitous rate to the base line. The two transients thus form a short duration positive going pulse, or spike 44a and there is no residual DC component at the transformer secondary. After the leading edge of the rectangular pulse and spike 44a is finished, the input circuit is quite ready to wait an indeterminate time for the rectangular pulse which instituted the two spikes to end.

At the trailing edge of the rectangular pulse 36, differentiating by capacitor C4 and resistor R2 marks the trailing edge, by an initial falling transient starting from the base line as the trailing edge begins and a second rising transient as the trailing edge ends, the rising transient as before being less precipitous as it returns to the base line. The two transients form a short duration negative going pulse or spike 44b. Thus, at the transformer secondary, there is no DC component after the trailing edge of the rectangular pulse, even though a non-50% duty cycle is present and the spikes 44a and 44b are transmitted at a constant amplitude dependent on the circuit parameters and not dependent on the duty cycle selection.

Thus assuming a variable duty cycle in the fixed period for the driver pulses; the differentiated pairs of spikes, with the first spike (44a) of the pair being of opposite polarity to the second spike (44b) of the pair are of equal amplitude and they are separated by an interval equal to the duration of the "on" state of the driver pulse.

Figure 2:
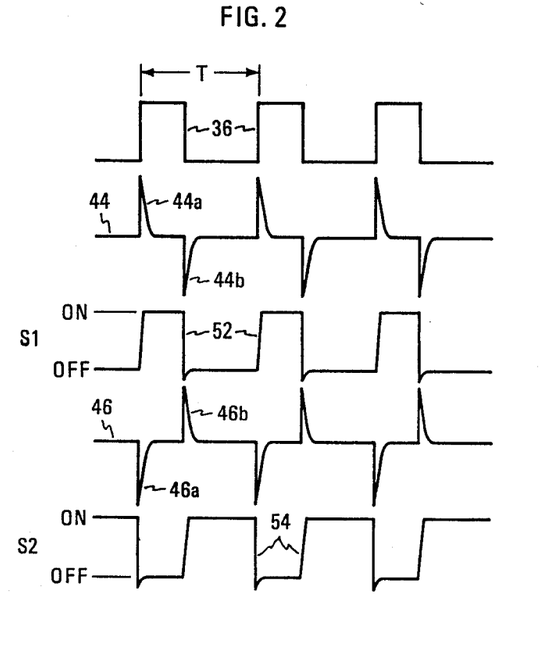
FIG. 2 is a signal timing diagram illustrating the operation of the power conversion circuit of FIG. 1.

The spike pairs 44a and 44b reoccur at the same period (T as shown in FIG. 2) as the driver pulse. The source of square wave driver pulses (34), the capacitor C4, the resistor R2, and the primary winding 38 are designed to facilitate the formation of spikes having a duration of about 0.2 microsecond. Resistor R2, shunting the primary winding 38, provides a reset path for the transformer magnetizing inductance and affords critical circuit damping, thus discharging the capacitor C4 in minimum time to facilitate charging in an opposite sense whenever the trailing edge of the rectangular pulse appears. The time constant of the circuit thus establishes the minimum "on" times for the circuit. The transformer T1 must be of a design suitable for transferring the sharply differentiated 0.1 to 0.2 microseconds spikes to its two secondary windings 40 and 42 equally.

The secondary windings 40 and 42 of the transformer T1, are matched to provide from the single train of short duration pulses 36 applied to the primary windings two trains of oppositely sensed, but equal amplitude, equal duration, and equally timed short duration pulses (44, 46) at the respective secondary windings (40, 42). As a result one switch will be turned "on" as the other is turned "off" and vice versa. In particular, on the leading edge of each driver pulse 36, a positive spike 44a is produced on secondary winding 40, and due to the inverted senses of the secondary winding connections to the input circuits of semiconductor switches S1 and S2, (illustrated by the dots in FIG. 1A), a negative spike 46a is produced on the secondary winding 42. On the trailing edge of each driver pulse, a negative spike 44b and a positive spike 46b appears on secondary windings 40 and 42 respectively. The two trains of spikes 44 and 46 are thus precisely matched except for polarity, having substantially identical timing, amplitudes and wave shapes. In other words one train of spikes (44) supplied to the input circuit if one swmiconductor switch is an inversion of the other train supplied to the other semiconductor switch.

In accordance with the invention, the train of spikes 44 on the secondary winding 40 and the train of spikes 46 on the secondary winding 42 are separately applied in the indicated mutually inverted polarities between the gates and sources of the semiconductor switches 51 and 52 via identical input networks generally indicated at 48 and 50. Each input network includes a series connected diode D3 and a small inductor L2 paralleled by the series combination of a second diode D4 and a Zener diode D5. The dotted terminal of the winding 40 is connected via network 48 to the gate of semiconductor switch S1 and the undotted terminal of the winding 40 is directly connected to the source of semiconductor switch S1. Correspondingly, the undotted terminal of the winding 42 is directly connected via network 50 to the gate of semiconductor switch S2, and the dotted terminal of the winding 42 is connected to the source of semiconductor switch S2.

The switches S1 and S2 are high impedance insulated gate semiconductor switches, as earlier stated, which are capable of commutation to an "on" or "off" state by the relatively low energy spikes available from the transformer 30. In addition, circuit capacity illustrated by the capacitors C5, shown in parallel with the gate and source electrodes, sustains the voltage at the gate in a manner modified by the operation of the input networks 48 and 50 now to be described.

The input networks 48 and 50, supplemented by the gate capacity of the semiconductor switches (or by an optional separate capacitive element), recreate new trains of rectangular pulses 52 and 54, which appear at the respective input of the semiconducting switches, from the successive positive and negative going spikes 44 and 46. The positive going spike 44a initiates a new "positively" sensed rectangular pulse, and the succeeding negative going spike 44b, terminates the rectangular pulse 52 at the gate of S1. The process is repeated to form a train of positively sensed pulses 52 at the input network 48. A similar train of oppositely phased or negatively sensed rectangular pulses 54, synchronous with the positivele sensed train of pulses, appears as a result of the spikes 46a and 46b at the input network 50.

The rectangular pulses 52 at the input circuit of semiconductor switch S1 are formed in the following manner. (The rectangular pulses 54 are formed in a similar fashion, and their formation need not be separately described.) Assuming a positive going spike 44a at the dotted terminal of winding 40, the diode D3 is poled to be forward biased and admits charge in a first series path via the inductor L2 to the gate of semiconductor switch S1, where the capacitor C5 becomes charged. The capacitance of capacitor C5, present between gate and source, may be realized by the intrinsic gate to source capacity of the semiconductor switch S1, or if that capacity is inadequate to retain the charge for the commutating period, the intrinsic capacity may be supplemented by an external capacitor. (The symbol C5 is designed to represent both possibilities.)

The onset of the charging is delayed slightly by the small inductor L2. The charge stored in the capacitor C5 is then sustained by the diode D3, which is poled to prevent leakage of the charge from storage. The Zener diode D5 in the second path of the input network is also poled to prevent leakage of the charge. The input network is designed to hold the charge for the full period T (FIG. 2) of the pulse train, corresponding to a nearly 100% "on" time.

The "high" state of the rectangular pulse waveform 52 now appearing at the gate of the switches S1 and S2 is thus sustained, but only until it is terminated by the oppositely sensed spike 44b, which next appears. As the spike 44b is applied, the diode D3 is reversely sensed and does not conduct, and the first series path remains quiescent. The diode D4 in the second series path is forward biased, however, and the Zener diode D5 is poled to oppose conduction initially as the voltage on its anode is pulled toward the negative voltage of the secondary winding 40. The Zener diode then breaks down as the difference between the negative voltage on the secondary winding 40 at its anode and the positive gate voltage on its cathode exceeds the breakdown voltage of the Zener diode. The Zener conducts to abruptly remove the charge on the capacitance C5 and brings the gate voltage substantially to zero. At this instant semiconductor switch S1 is commutated "off". The conduction time of semiconductor switch S1 during each commutation cycle is indicated by the "on" times of the rectangular pulse 52 in FIG. 2.

The commutation of shunt semiconductor switch S2 is complementary to series semiconductor switch S1 and one is turned "off" as the other is turned "on". The negative spike 46a, which is coincident in time with positive spike 44a, renders switch S2 non-conductive, and positive spike 46b drives switch S2 into conduction as coincident negative pulse 44b drives switch S1 into non-conduction. The input circuit 50 forms a rectangular pulse waveform 54 at the input of the semiconductor switch S2 inverted from that at the gate of semiconductor switch S1. The interval that switch S2 conducts during each commutation cycle is indicated by the "on" time of the rectangular pulse at 54 in FIG. 2 and may be seen to occur only when S1 is non-conductive.

As has been shown, the duration of the "high" state of the drive pulses 36 establishes the conduction interval of semiconductor switch S1 and non-conduction of semiconductor switch S2 during a period T and the duration of the "low" state of the rectangular drive pulses 36 establishes the non-conduction interval of semiconductor switch S1 and the conduction interval of semiconductor switch S2 during the period T. Thus the duty cycle of the converter may be varied by changing the duty cycle of drive pulse 36 as a percentage of the pulse repetition period T.

Changing the duty cycle in a buck or a boost converter has the well known effect of changing the output voltage. The power conversion circuit 10 in the illustrated embodiment is operable over a duty cycle range from 2% to 98%. A drive pulse frequency of 100 KHZ provides a usable power frequency bandwidth from 0 to 10 KHZ.

Selection of an appropriate drive pulse or switch commutation frequency involves several considerations. It should be high relative to the frequency of source 14 such that there is minimal change in the voltage wave during a commutation period T. A high commutation frequency also accommodates a reduction in the size of energy storage inductor L1. The advantages of high frequency commutation must however be balanced with the increase in commutation loss as the commutation frequency is increased.

The use of a high input impedance, insulated gate voltage responsive transistor switches (S1, S2) facilitates low energy switching and high frequency commutation with the result that very substantial size reductions may be achieved between a power supply of the type herein described, and a conventional variac. A variac of 200 VA capacity typically weights about 3½ pounds, while the present converter with the same VA rating weights about 6 ounces.

High accuracy in the mutual timing of pulse trains 44 and 46 in the transformer T1 facilitates a low cost solution to any slight variations in mutual timing of the semiconductor switches which may occur under varying load conditions. If the periods that semiconductor switches S1 and S2 are both "on" or both are very short, the correction required to protect the switches is inexpensive. In the FIG. 1A arrangement simultaneous conduction of the two switches is prevented by the inclusion of an inductor L2 in each of the input networks 48 and 50. The inductor L2 which may take the form of a conductor threaded through a ferrite head in the first path of the input circuit, slightly delays switch turn "on", in respect to turn "off", the turn "off" current proceeding via the Zener diode in the other path of the input circuit. Thus simultaneous conduction is prevented, and the capacitor C1 across source terminals 12 and 13, never discharges through the series path that would be formed when both switches S1 and S2 conduct. Similarly, a simultaneous "off" state of the two switches cannot be tolerated since the inductor L1 must retain a path for discharging its magnetic field. This is also cured with a similar low cost fix. The resistor R1-capacitor C3 provide "snubber" circuits connected between source and drain of each switch to provide a current path for the inductor L1 during the brief simultaneous "off" condition of semiconductor switches S1 and S2. In addition a protective diode D7 may be provided to the semiconductor switch S2 from a reverse current surge.

Figure 3:
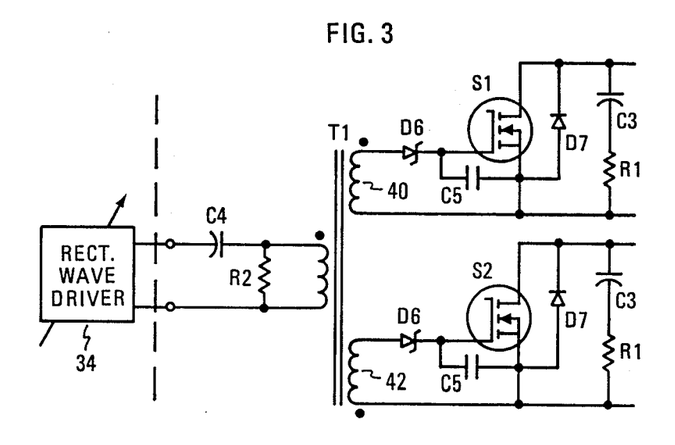
FIG. 3 is a schematic circuit diagram illustrating a simplified construction of the switch commutating section in the power conversion circuit of FIGS. 1A and 1B.

At low commutation or drive pulse frequencies, some degree of simultaneous switch conduction may be tolerated due to the high accuracy of the mutual timing of the pulse trains 44 and 46 which makes the joint conduction period very small. In such applications, the input networks 48 and 50 of FIG. 1 may be replaced by single Zener diodes D6 as shown in FIG. 3. These diodes are forward biased by positive commutating pulses 44a, 46b to charge the gate capacitances of switches S1, S2, driving them into conduction. Negative commutating pulses 44b, 46a reverse bias these Zener diodes into breakdown, thereby discharging the gate capacitances to turn the switches "off". The circuit, in the event of simultaneous "off" states is preferably provided with snubber circuits ($C_pR_1$) and the protective diode D7.

FIG. 1A illustrates the first embodiment with the source connected to the converter terminals 12 and 13 and the load connected to the converter terminals 16 and 17. This mode of connection provides "buck" conversion operation and the voltage at the load, varies from near equality to a small fraction of the source voltage in direct proportion to the duty cycle. When the source is connected to the terminals 16 and 17 and the load is connected to the terminals 12 and 13, the embodiment operates as a boost converter. Under these conditions the voltage at the load varies from a value near equality to a value substantially greater than the source voltage in proportion to the duty cycle. Of course, the upper limits of the voltage at the load are limited by the voltage ratings of the components.

In relation to the first embodiment, the proportions of the inputs and outputs are reciprocally related as a function of the buck and the boost connections. If there is a short duty cycle, a large step down appears in buck converter operation and a large step up appears in boost converter operation. The two relationships are almost exactly reciprocal.

The first embodiment has full four quadrant operation, in that the source may have either positive or negative voltage and may have either positive or negative currents. In other words the power flow may be in one direction for positive voltage and positive current or negative voltage and negative current. The power flow may also be in the opposite direction for positive voltage and negative current or negative voltage and positive current.

Figures 4A, 4B:
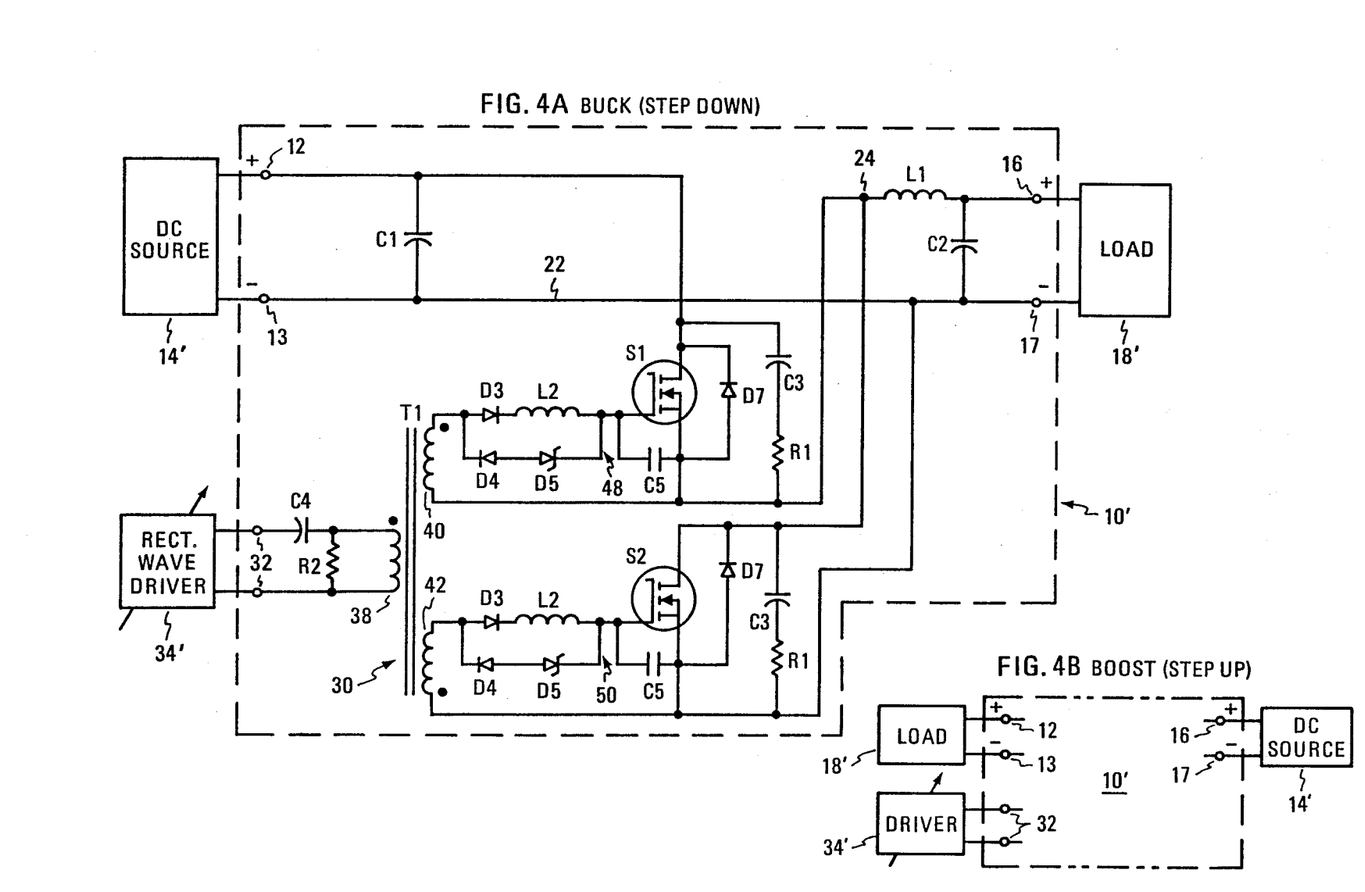
FIGS. 4A and 4B are schematic circuit diagrams of an electrical power conversion circuit suited to a positive polarity DC energy source; the FIG. 4A connections providing buck conversion operation, and the FIG. 4B connections provide boost conversion operation.
Figures 5A, 5B:
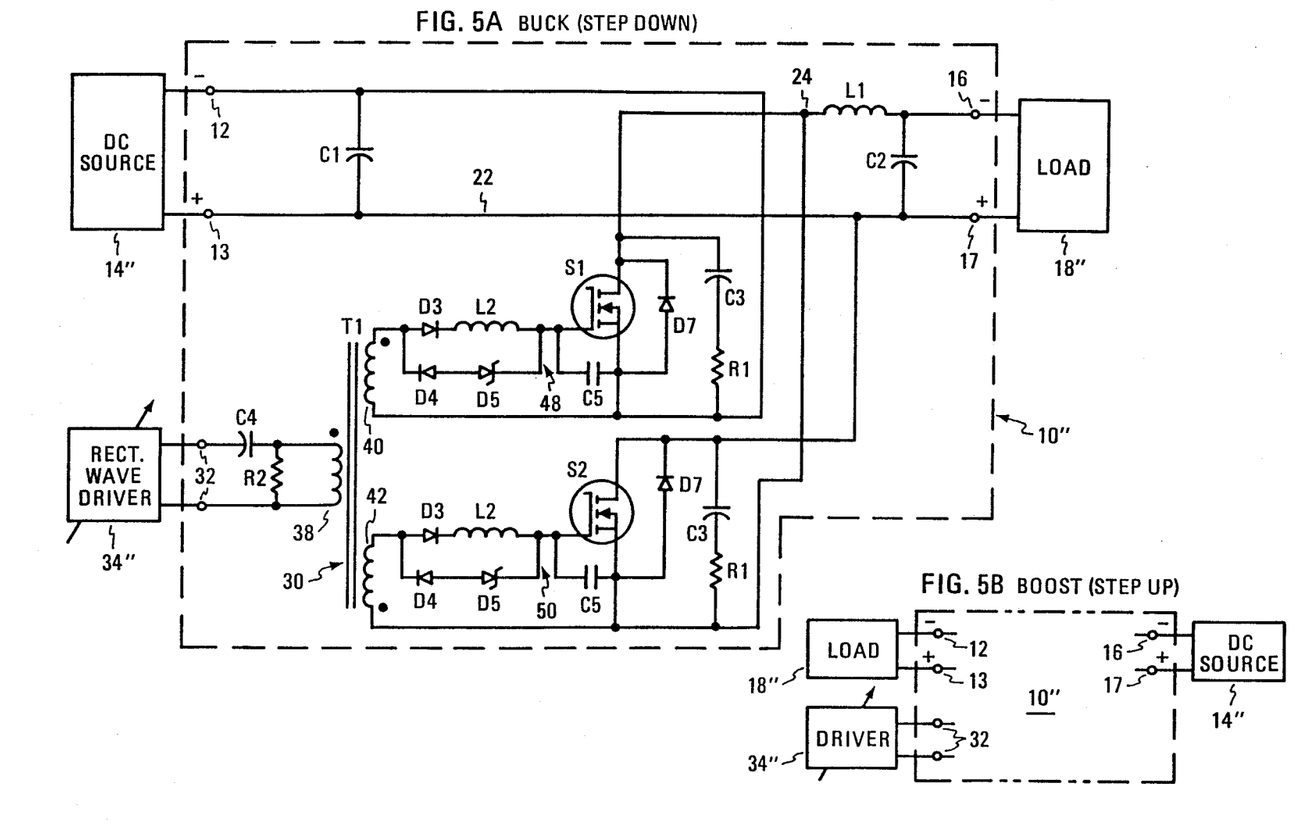
FIGS. 5A and 5B are schematic circuit diagrams of an electrical power conversion circuit suited to a negative polarity DC energy source; the FIG. 5A connections providing buck conversion operation and the FIG. 5B connection providing boost conversation operation.

The inventive principles may be equally applied to the buck/boost converter illustrated in FIGS. 4A and 4B for a positive DC voltage source or the buck/boost converter illustrated in FIGS. 5A and 5B for a negative DC voltage source. However, the current direction is not similarly restricted, and the two quadrant bidirectional power flows are allowed.

The reciprocal conversion factors previously explained in connection with the first embodiment is also retained in the FIGS. 4A–B and 5A–B embodiments. In all embodiments a minimum weight electrical power converter may be achieved, weighing only a fraction of the weight of a comparable conventional supply.

For an embodiment corresponding to FIGS. 1A–1B capable of zero to 150 volts source voltage and zero to two amperes load currents for a rated power of 300 volt amperes, the following operating parameters are appropriate:

The drive waveform from driver 34 is a 15 volt 100 KHZ rectangular wave. A differentiating time constant of 100 nanoseconds is achieved by means of a capacitor C4 of 0.002 $\mu f$ and a resistor R2 of 51.1 ohms. The transformer T1 is an EP 10 structure, ferrite cored transformer having a 1:1:1 turns ratio and a volt time capability of approximately 5 microvolt-seconds.

The Zener diodes (D5) are of 10 volts, which helps to maintain the gate voltages of the MOSFET switches S1 and S2 well into saturation.

The MOSFET switches are IRF450 devices with a rating of 500 volts drain to source and a continuous drain current of 13 amperes. The voltage and currents applied in this circuit are limited to the voltage on terminals 12 and 13 and the current in terminal 16. The gate capacitance of the IRF450 is approximately 2700 pf which is adequate for charge storage (i.e. C5) without augmentation.

The energy storage inductor L1 has a current rating the same as terminal 16 current and has a value of 400 $\mu h$. Capacitors C1 and C2 are 0.47 $\mu f$ conservatively rated at 500 volts.

The inductor L2 is a ferrite bead with a single turn yielding an inductance of 200 nh. The R1–C3 snubber is 100 ohms and 1000 pf with a maximum dissipation capability of 2 watts. The diode D7 is an inherent part of the MOSFET transistor chosen and thus need not be separately provided.

The diode bridges D1 and D2 are 600 volt, 5 amp rated.

The embodiment just described, in a separate aluminum package weights about 6 ounces, one-tenth the weight of a comparable variac and is readily packaged to occupy one-tenth the volumn of a comparable variac. While a MOSFET transistor has been shown in performance of the switching function, other insulated, voltage controlled, commutating gate devices may be used. Suitable devices presently available include MOSFETS, IGBTs (i.e. insulated gate bipolar transistors) and MCTS (MOS controlled thyristors). Under development are additional devices such as a bidirectional switching device, the practical equivalent of a MOSFET and a bridge rectifier.

From the foregoing description, it is seen that the present invention provides a power conversion circuit which in the first embodiment is capable of full four quadrant operation to handle bidirectional energy flows with complementary conversion factors in true transformer fashion with AC or DC power sources and which in the later embodiments permits two quadrant operation with DC energy sources. Moreover, this bidirectionality renders the power conversion circuits adaptable to either voltage step-up, boost converter applications or voltage step-down, buck converter applications. The duty cycle is readily adjustable over a wide range to suit varied load requirements.

Moreover, the power conversion circuit of the present invention is capable of producing output waveforms that are faithful reproductions of the input waveforms so long as the frequency of the rectangular wave driver is suitably high. Thus, no significant harmonics of the input waveform need be added to the output waveform. Any noise introduced to the output is at the commutation frequency, which may be sufficiently high to permit easy removal in filtering out. Commutation losses are low and readily controllable to afford high operating efficiency. Low power frequencies down to and including DC are accommodated without requiring an increase in the size and weight of the circuit components.

From the foregoing description, it is seen that the objects set forth above, including those made apparent from the preceding description, are efficiently attained, and, since certain changes may be made in the constructions set forth, it is intended that all matters of detail be taken as illustrative and not in a limiting sense.

What is claimed is:

1. An electrical power conversion circuit having a variable voltage conversion ratio comprising,
    (A) a first pair of terminals consisting of a first and a second terminal and a second pair of terminals consisting of a third and a fourth terminal, one pair of terminals being for connection to a source of supply voltage and the other pair of terminals being for connection to a load, said second terminal and said fourth terminal being connected together at a first node;
    (B) a first bidirectionally conducting switching circuit, comprising a first semiconductor switch having an insulated, voltage controlled, commutating gate, source and drain electrodes, said first switching circuit providing charge storing capacity between gate and source electrodes and including a first Zener diode serially connected to said gate poled to prevent leakage of stored charge until its breakdown voltage is exceeded, said first switching circuit being connected between said first terminal and a second node;
    (C) an energy storing inductor connected between said second node and said third terminal;
    (D) a second bidirectionally conducting switching circuit, comprising a second semiconductor switch having an insulated, voltage controlled, commutating gate, source and drain electrodes, said second switching circuit providing charge storing capacity between gate and source electrodes and including a second Zener diode serially connected to said gate poled to prevent leakage of stored charge until its breakdown voltage is exceeded, said second switching circuit being connected between said first and said second nodes;

(E) means for supplying a single train of pairs of short duration control pulses having a given period for each pulse pair, the first pulse being of opposite polarity to the second pulse of each pair and the interval between pulses of each pair being adjustable and less than said pulse pair period to establish a desired conduction duty cycle for said switches; and (F) means for generating two simultaneous trains of pairs of short duration pulses from said single train for controlling the conduction periods of said semiconductor switches comprising:

a pulse transformer having a primary winding to which said first train is coupled, and a pair of matched, mutually independent, secondary windings, one secondary winding being connected in one polarity via said first Zener diode between the gate and drain electrodes of the first semiconductor switch and the other secondary winding being connected in the reverse polarity via said second Zener diode between the gate and drain electrodes of the second semiconductor switch, the pulse pairs in said secondary windings providing adequate voltage to successively initiate conduction, said charge storing capacity maintaining conduction, and upon exceeding the Zener breakdown voltage to remove said charge and terminate conduction, whereby the first semiconductor switch is turned "on" as the second semiconductor switch is turned "off" and vice-versa, avoiding any significant period during which both semiconductor switches are "on" or both semiconductor switches are "off".

2. The electrical power conversion circuit set forth in claim 1, wherein said individual control pulses are proportioned to supply adequate energy to the load presented by the gate circuits of said semiconductor switches for commutation and are of short duration in relation to said pulse pair period to minimize the size of the pulse transformer and the size of said energy storing inductor and to facilitate a wide range of duty cycle settings and voltage conversion ratios.

3. The electrical power conversion circuit set forth in claim 2, wherein said individual pulses have a duration on the order of one-tenth microsecond and said pulse pair period is on the order of 10 microseconds to provide a range of duty cycle settings from about 2% to 98%, and a correspondingly wide range of voltage conversion ratios.

4. The electrical power conversion circuit set forth in claim 2, wherein said source is either AC or DC of either polarity.

5. The electrical power conversion circuit set forth in claim 2, wherein said means for supplying said single train of pairs of short duration control pulses comprises (A) control terminals for application of rectangular pulses of variable duration and of a given period for controlling said voltage conversion ratio; and (B) means coupled to said control terminals for differentiating said variable duration rectangular pulses to obtain said single train of pairs of short duration pulses, the first and second pulses of each pair marking the beginning and ending of a given "on" or "off" state of said variable duration pulses, each pulse having a duration less than said period.

6. The electrical power conversion circuit defined in claim 1, wherein said first and second semiconductor switches are unidirectional, said first and second switching circuits each including a full-wave rectifying bridge having AC and DC terminals for bidirectional switching, the DC bridge terminals being connected to the source and drain of the associated semiconductor switch while said AC bridge terminals are connected respectively between said first terminal and said second node; and between said first and second nodes.

7. The electrical power conversion circuit set forth in claim 6, wherein first and second snubbing circuits are provided connected respectively between the source and drain electrodes of the first and second semiconductor switches, each snubbing circuit comprising a serially connected storage capacitor and resistor for absorbing and dissipating energy stored in said inductor, should both of said semiconductor switches be momentarily "off".

8. The electrical power conversion circuit set forth in claim 6, wherein first and second means are provided to delay the turn "on" of said first and second semiconductor switches respectively so as to avoid simultaneous turn "on" of both switches, each said delay means including a series connected inductor and diode poled to prevent leakage of stored charge, said delay means being connected in shunt with said Zener diode.

9. The electrical power conversion circuit set forth in claim 8, wherein first and second snubbing circuits are provided connected respectively between the source and drain electrodes of the first and second semiconductor switches, each snubbing circuit comprising a serially connected storage capacitor and resistor for absorbing and dissipating energy stored in said inductor should both of said semiconductor switches be momentarily "off".

10. The electrical power conversion circuit set forth in claim 9, wherein a first and a second filter capacitor are provided, one capacitor connected between said first and second terminals, and the other capacitor being connected between said third and fourth terminals.

11. An electrical power conversion circuit having a variable voltage conversion ratio comprising, (A) a first pair of terminals consisting of a first and a second terminal and a second pair of terminals consisting of a third and a fourth terminal, one pair of terminals being for connection to a source of DC supply voltge having a positive and a negative terminal and the other pair of terminals being for connection to a load, said second terminal and said fourth terminal being connected together at a first node to said negative source terminal;

(B) a first switching circuit, comprising a first semiconductor switch having an insulated, voltage controlled, commutating gate, source and drain electrodes, said first switching circuit providing charge storing capacity between gate and source electrodes and including a first Zener diode serially connected to said gate poled to prevent leakage of stored charge until its breakdown voltage is exceeded, the drain of said first semiconductor switch being connected to said first input terminal and the source of said first semiconductor switch being connected to said second node;

(C) an energy storing inductor connected between said second node and said first output terminal;

(D) a second switching circuit, comprising a second semiconductor switch having an insulated, voltage controlled, commutating gate, source and drain electrodes, said second switching circuit providing charge storing capacity between gate and source electrodes and including a second Zener diode serially connected to said gate poled to prevent leakage of stored charge until its breakdown voltage is exceeded, the drain of said second semiconductor switch being connected to said first node and the source of said second semiconductor switch being connected to said second node;

(E) means for supplying a single train of pairs of short duration control pulses having a given period for each pulse pair, the first pulse being of opposite polarity to the second pulse of each pair and the interval between pulses of each pair being adjustable and less than said pulse pair period to establish a desired conduction duty cycle for said switches; and (F) means for generating two simultaneous trains of pairs of short duration pulses from said single train for controlling the conduction periods of said semiconductor switches comprising:

a pulse transformer having a primary winding to which said first train is coupled, and a pair of matched, mutually independent, secondary windings, one secondary winding being connected in one polarity via said first Zener diode between the gate and drain electrodes of the first semiconductor switch and the other secondary winding being connected in the reverse polarity via said second Zener diode between the gate and drain electrodes of the second semiconductor switch, the pulse pairs in said secondary windings providing adequate voltage to successively initiate conduction, said charge storing capacity maintaining conduction and upon exceeding the Zener breakdown voltage to remove said charge and to terminate conduction, whereby the first semiconductor switch is turned "on" as the second semiconductor switch is turned "off" and vice-versa, avoiding any significant period during which both semiconductor switches are "on" or both semiconductor switches are "off".

12. The electrical power conversion circuit set forth in claim 11, wherein said individual control pulses are proportioned to supply adequate energy to the load presented by the gate circuits of said semiconductor switches for commutation and are of short duration in relation to said pulse pair period to minimize the size of the pulse transformer and the size of said energy storing inductor and to facilitate a wide range of duty cycle settings and voltage conversion ratios.

13. The electrical power conversion circuit set forth in claim 12, wherein said individual pulses have a duration on the order of one-tenth microsecond and said pulse pair period is on the order of 10 microseconds to provide a range of duty cycle settings from about 2% to 98%, and a correspondingly wide range of voltage conversion ratios.

14. The electrical power conversion circuit set forth in claim 12, wherein said means for supplying said single train of pairs of short duration control pulses comprises (A) control terminals for application of rectangular pulses of variable duration and of a given period for controlling said voltage conversion ratio; and (B) means coupled to said control terminals for differentiating said variable duration rectangular pulses to obtain said single train of pairs of short duration pulses, the first and second pulses of each pair marking the beginning and ending of a given "on" or "off" state of said variable duration pulses, each pulse having a duration less than said period.

15. An electrical power conversion circuit having a variable voltage conversion ratio comprising, (A) a first pair of terminals consisting of a first and a second terminal and a second pair of terminals consisting of a third and a fourth terminal, one pair of terminals being for connection to a source of DC supply voltage having a positive and a negative terminal and the other pair of terminals being for connection to a load, said second terminal and said fourth terminal being connected together at a first node to said positive source terminal;

(B) an energy storing inductor connected between said first terminal and a second node.

(C) a first switching circuit, comprising a first semiconductor switch having an insulated, voltage controlled, commutating gate, source and drain electrodes, said first switching circuit providing charge storing capacity between gate and source electrodes and including a first Zener diode serially connected to said gate poled to prevent leakage of stored charge until its breakdown voltage is exceeded, the drain of said first semiconductor switch being connected to said second node and the source of said first semiconductor switch being connected to said first output terminal;

(D) a second switching circuit, comprising a second semiconductor switch having an insulated, voltage controlled, commutating gate, source and drain electrodes, said second switching circuit providing charge storing capacity between gate and source electrodes and including a second Zener diode serially connected to said gate poled to prevent leakage of stored charge until its breakdown voltage is exceeded, the drain of said second semiconductor switch being connected to said second node and the source of said second semiconductor switch being connected to said first node;

(E) means for supplying a single series of pairs of short duration control pulses having a given period for each pulse pair, the first pulse being of opposite polarity to the second pulse of each pair and the interval between pulses of each pair being adjustable and less than said pulse pair period to establish a desired conduction duty cycle for said switches; and (F) means for generating two simultaneous series of pairs of short duration pulses from said single series of pairs of short duration pulses for controlling the conduction periods of said semiconductor switches comprising:

a pulse transformer having a primary winding to which said first series of short duration pulses is coupled, and a pair of matched, mutually independent, secondary windings, one secondary winding being connected in one polarity via said first Zener diode between the gate and drain electrodes of the first semiconductor switch and the other secondary winding being connected in the reverse polarity via said second Zener diode between the gate and drain electrodes of the second semiconductor switch, the pulse pairs in said secondary windings providing adequate voltage to successively initiate conduction, said charge storing capacity maintaining conduction and upon exceeding the Zener breakdown voltage to remove said charge and to terminate conduction, whereby the first semiconductor switch is turned "on" as the second semiconductor switch is turned "off" and vice-versa, avoiding any significant period during which both semiconductor switches are "on" or both semiconductor switches are "off".

16. The electrical power conversion circuit set forth in claim 15, wherein said individual control pulses are proportioned to supply adequate energy to the load presented by the gate circuits of said semiconductor switches for commutation and are of short duration in relation to said pulse pair period to minimize the size of the pulse transformer and the size of said energy storing inductor and to facilitate a wide range of duty cycle settings and voltage conversion ratios.

17. The electrical power conversion circuit set forth in claim 16, wherein said individual pulses have a duration on the order of one-tenth microsecond and said pulse pair period is on the order of 10 microseconds to provide a range of duty cycle settings from about 2% to 98%, and a correspondingly wide range of voltage conversion ratios.

18. The electrical power conversion circuit set forth in claim 16, wherein said means for supplying said single series of pairs of short duration control pulses comprises (A) control terminals for application of rectangular pulses of variable duration and of a given period for controlling said voltage conversion ratio; and (B) means coupled to said control terminals for differentiating said variable duration rectangular pulses to obtain said single series of pairs of short duration pulses, the first and second pulses of each pair marking the beginning and ending of a given "on" or "off" state of said variable duration pulses, each pulse having a duration substantially less than said period.

* * * * *